(12) United States Patent
Park

(10) Patent No.: US 8,766,494 B2
(45) Date of Patent: Jul. 1, 2014

(54) LINEAR VIBRATOR

(75) Inventor: Young Il Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 146 days.

(21) Appl. No.: 13/265,719

(22) PCT Filed: Apr. 22, 2010

(86) PCT No.: PCT/KR2010/002516
§ 371 (c)(1),
(2), (4) Date: Oct. 21, 2011

(87) PCT Pub. No.: WO2010/123288
PCT Pub. Date: Oct. 28, 2010

(65) Prior Publication Data
US 2012/0032535 A1    Feb. 9, 2012

(30) Foreign Application Priority Data
Apr. 22, 2009    (KR) .................. 10-2009-0034984

(51) Int. Cl.
*H02K 33/00*    (2006.01)
(52) U.S. Cl.
USPC ........................................................ 310/25
(58) Field of Classification Search
USPC ............ 310/20, 21, 23, 25, 28–30, 36–37, 15
IPC .......................................... H02K 33/00,33/02
See application file for complete search history.

(56) References Cited

U.S. PATENT DOCUMENTS

| 3,312,841 A * | 4/1967 | Makino ............................ 310/15 |
| 6,262,500 B1 * | 7/2001 | Wakiwaka et al. ............. 310/15 |
| 6,400,053 B1 * | 6/2002 | Horng ............................. 310/91 |
| 7,355,305 B2 * | 4/2008 | Nakamura et al. .......... 310/12.03 |
| 2009/0096299 A1 * | 4/2009 | Ota et al. ......................... 310/25 |
| 2009/0243404 A1 * | 10/2009 | Kim et al. ....................... 310/25 |
| 2010/0213773 A1 * | 8/2010 | Dong et al. ..................... 310/25 |

FOREIGN PATENT DOCUMENTS

| JP | 2003-010783 A | 1/2003 |
| KR | 10-2006-0120859 A | 11/2006 |
| KR | 720197 B1 * | 5/2007 |
| KR | 10-2007-0103174 A | 10/2007 |
| KR | 802414 B1 * | 2/2008 |

OTHER PUBLICATIONS

KR 720197—K-PION English Machine Translation.*
KR 802414—K-PION English Machine Translation.*
Ferromagnetic Materials: A Handbook on the Properties of Magnetically Ordered Substances, vol. 2. Amsterdam, North-Holland. 1986. pp. 74.*
International Search Report in International Application No. PCT/KR2010/002516, filed Apr. 22, 2010.

* cited by examiner

*Primary Examiner* — Tran Nguyen
(74) *Attorney, Agent, or Firm* — Saliwanchik, Lloyd & Eisenschenk

(57) ABSTRACT

A linear vibrator is disclosed, characterized by: a housing; a stator fixed inside the housing; a vibrating unit formed with an opening for surrounding the stator and vibrating inside the housing by being interactive with the stator; and an elastic member elastically supporting the vibrator inside the housing, whereby the vibrating unit is vibrated in the width direction to enable a reduced thickness of the housing.

17 Claims, 6 Drawing Sheets

LINEAR VIBRATOR

CROSS-REFERENCE TO RELATED APPLICATION

This application is the U.S. national stage application of International Patent Application No. PCT/KR2010/002516, filed Apr. 22, 2010, which claims priority to Korean Application No. 10-2009-0034984, filed Apr. 22, 2009, the disclosures of each of which are incorporated herein by reference in their entirety.

TECHNICAL FIELD

The present invention relates to a linear vibrator.

BACKGROUND ART

In general, portable electronic equipment is embedded with a signal generating device for generating a vibration to alert arrival of a receiving signal. The signal generating device may include a sound generating device and a vibration generating device.

The vibration generating device in the portable electronic equipment alerting a device user of arrival of a receiving signal may include a cylindrical coil arranged underneath a housing, a yoke disposed at an upper surface of the housing to be connected to a spring, a magnet disposed at an inner lateral surface of the yoke to reciprocally move inside the cylindrical coil, and a weight disposed at an external surface of the yoke.

The related art vibration generating device described above is configured to transfer vibration generated by the magnet and the reciprocal movement of the weight to the housing through the spring. The related art vibration generating device described above suffers from disadvantages in that the thickness can hardly reduced due to a structure in which the coil, the magnet and the spring are vertically provided.

DISCLOSURE OF INVENTION

Technical Problem

The present invention is disclosed to obviate the above-mentioned problems, and it is an object to provide a linear vibrator configured to effectively reduce a thickness of the linear vibrator.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the disclosure, as embodied and broadly described, there is provided a linear vibrator according to an exemplary embodiment of the disclosure, comprising: a housing; a stator fixed inside the housing; a vibrating unit formed with an opening for surrounding the stator and vibrating inside the housing by being interactive with the stator; and an elastic member elastically supporting the vibrator inside the housing.

Advantageous Effects of Invention

The linear vibrator according to the present invention is advantageous in that a vibrating unit is vibrated in the width direction to enable a reduced thickness of the housing.

BEST MODE FOR CARRYING OUT THE INVENTION

A linear vibrator according to exemplary embodiments of the present invention will be described in detail with reference to the following drawings.

First Exemplary Embodiment

Figure 1:
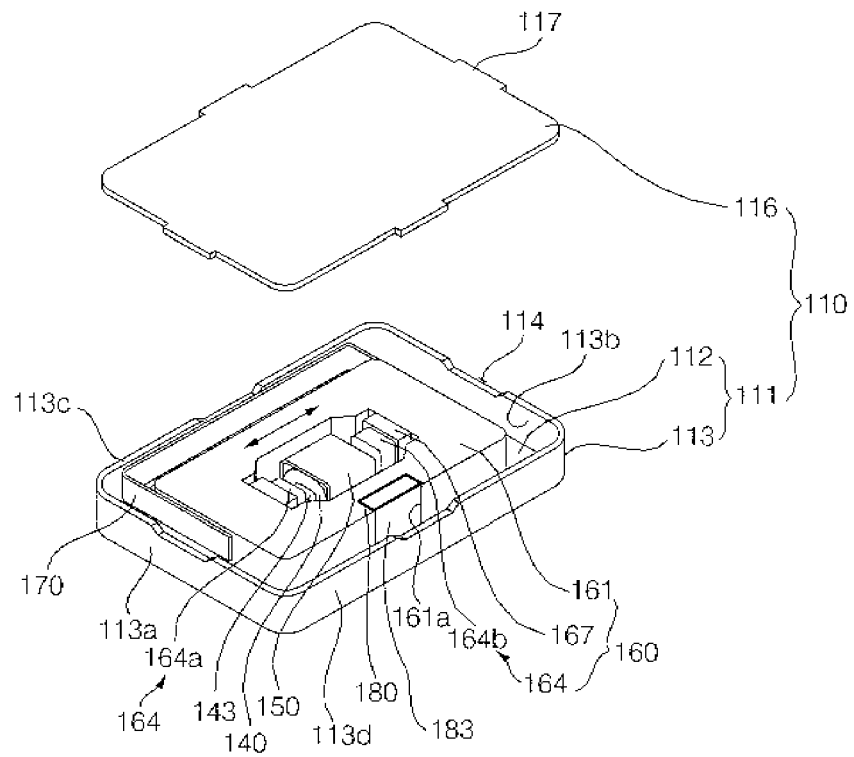
FIG. 1 is a perspective view of a linear vibrator according to an exemplary embodiment of the present invention.
Figure 2:
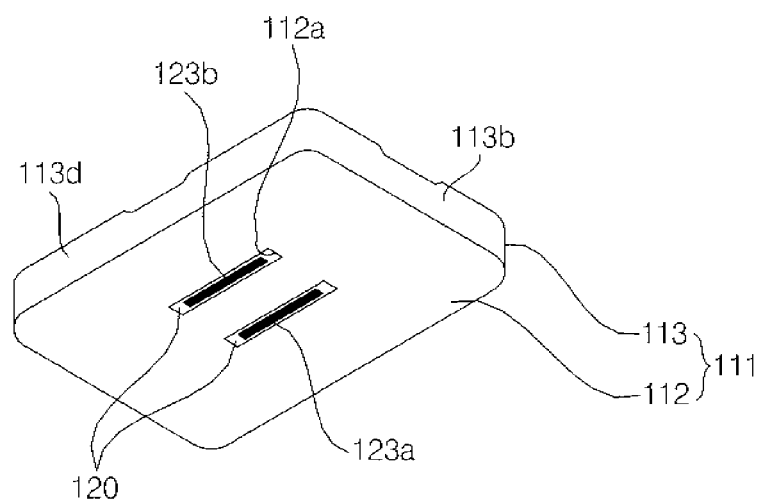
FIG. 2 is a perspective view of a bottom surface of a case illustrated in FIG. 1.
Figure 3:
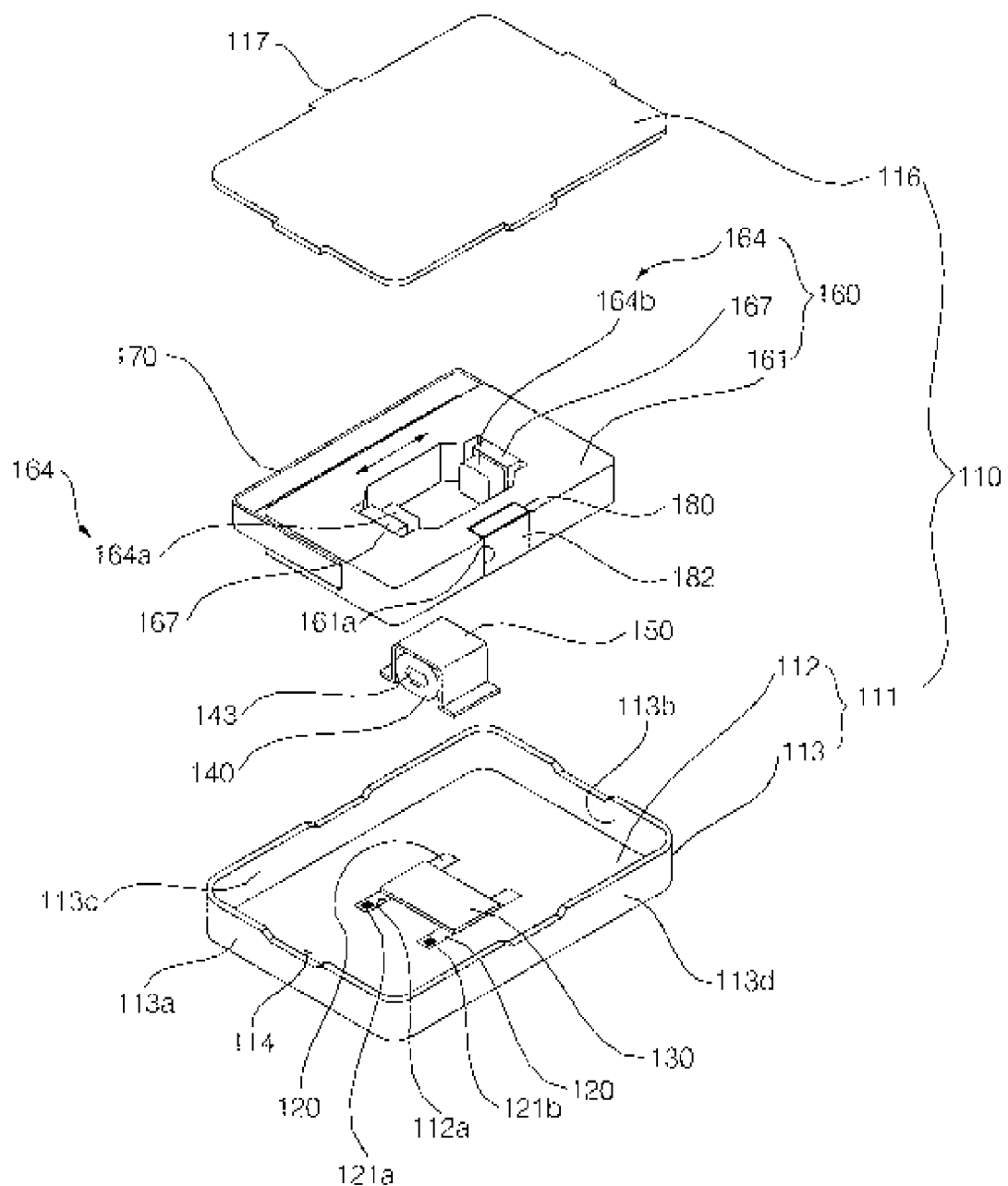
FIG. 3 is a partially exploded perspective view of FIG. 1.
Figure 4:
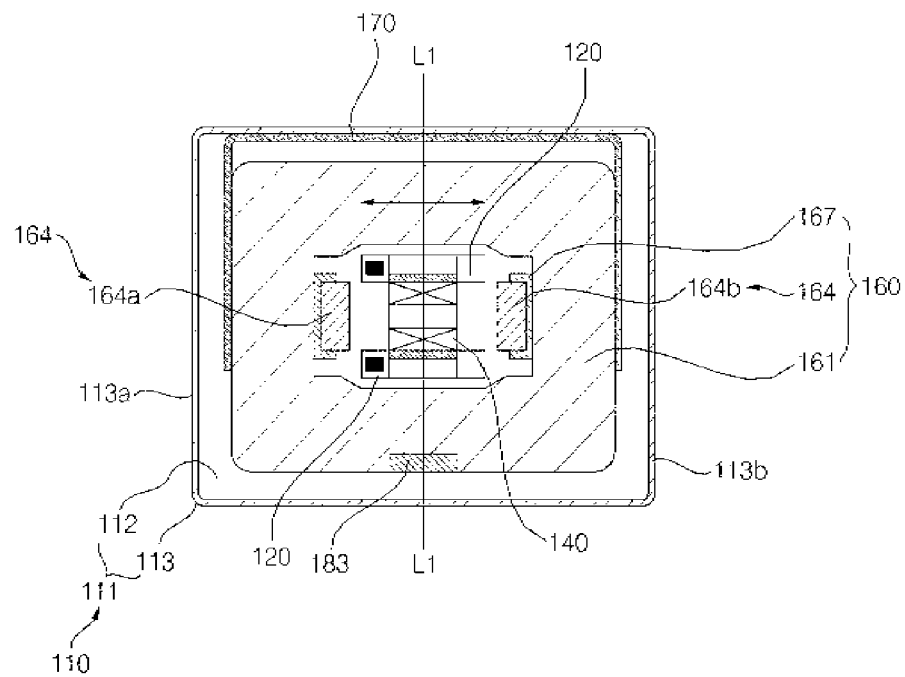
FIG. 4 is a plan view of FIG. 1.

FIG. 1 is a perspective view of a linear vibrator according to an exemplary embodiment of the present invention, FIG. 2 is a perspective view of a bottom surface of a case illustrated in FIG. 1, FIG. 3 is a partially exploded perspective view of FIG. 1, and FIG. 4 is a plan view of FIG. 1.

Referring to FIGS. 1 through 4, a linear vibrator mounted on a product such as a mobile terminal may include a housing (110), a stator (140), a vibrating unit (160) and an elastic member (170).

The housing (110) may be of a flat hexagonal shape having an accommodation space therein, where a longer surface direction of the hexagonal housing (110) is defined as a first direction while a shorter surface direction perpendicular to the longer surface direction of the hexagonal housing (110) is referred to as a second direction. The housing (110) may include a case 111 for forming the accommodation space and a cover (116).

The cover (116) is coupled to an upper surface of the opened case (111). An upper surface of a lateral plate (113) is formed with a plurality of insertion holes (114), and the cover (116) is formed with a plurality of coupling protruders (117) to be insertedly coupled to the insertion holes (114). The insertion holes (114) formed at the case (111) and the coupling protruders (117) formed at the cover (116) are mutually coupled to form the housing (110).

As shown in FIG. 2, the housing (110) may be disposed therein with a PCB (Printed Circuit Board. 120), the coil (140) which is a stator, the vibrating unit (160) and the elastic member (170). The PCB (120) has a striped shape to be coupled to a coupling hole (112a) formed at a pad (112), and an upper surface of the PCB (120) is connected to a lead line of the coil (140). At this time, the bottom surface of the PCB (120) is exposed to the outside of the housing (110) via the coupling hole (112a), whereby the bottom surface of the PCB (120) may be connected to a variety of electrical products, as shown in FIG. 2.

The PCB (120) is provided with a pair, one PCB being separated from the other PCB. Any one PCB (120) is formed at an upper surface and a bottom surface thereof with connection terminals (121a, 123a) in which a (+) lead line of the coil (140) and a (+) power terminal of the product are respectively connected. The other PCB (120) is formed at an upper surface and a bottom surface thereof with (−) connection terminals (121b, 123b) in which a (−) lead line of the coil (140) and a (−) power terminal of the product are respectively connected.

The PCB (120) insertedly coupled to the coupling hole (112a) of the pad (112) may be detached to the inside or the outside of the housing (110) by the shock applied from the outside. In order to prevent the PCB (120) from being detached, a hexagonal detachment prevention plate (130) is provided in which a central side thereof is coupled to the pad (112) and both distal ends thereof are respectively coupled to the PCBs (120), as illustrated in FIG. 3. In the present embodiment, the detachment prevention plate (130) may be one of a magnetic plate or a silicon steel.

The stator (140) inclusive of the coil is fixed at a floor plate (112) of the case (111) at the housing (110), and the stator (140) is fixed at the detachment prevention plate (130). The detachment prevention plate (130) is coupled to a support bracket (150) while the stator (140) is fixed at an inside of the support bracket (150).

The vibrating unit (160) is provided inside the case (111) of the housing (110). The vibrating unit (160) is provided on the same planar surface as that of the stator (140), whereby the stator (140) is fixed inside the vibrating unit (160). To be more specific, the vibrating unit (160) is provided inside the housing (110) in the shape of surrounding the stator (140).

The vibrating unit (160) reciprocates along the first direction. To be more specific, the vibrating unit (160) vibrates with a predetermined frequency in between a left plate (113a) opposite to the housing (110) and a right plate (113b). The vibrating unit (160) may include a weight (161), a pair of magnets (164) and a yoke (167).

The weight (161) has a square framed shape with a central opening into which a coil (140) is inserted, whereby the coil (140) is to be arranged inside the weight (140). Each piece of the pair of magnets (164a, 164b: 164) is arranged inside the weight (161) about the coil (140) to face the other. In a case a current flows in the stator (140) in the forward direction, the magnets (164) become interactive with the stator (140) to vibrate between the left plate (113a) and the right plate (113b) of the case (111) at the housing (110) and to resultantly vibrate the weight (161).

In a case a current flows in the stator (140), the vibrating unit (160) may be smoothly vibrated if magnets (164a, 164b) are arranged in such a manner that a gravitational force is applied between any one of the magnets (164a) and the coil (140), and a repulsive force is applied between the other magnet (164b) and the coil (140).

The yoke (167) is interposed between inner lateral surfaces of each magnet (164a, 164b) and the weight (161) to prevent the flux generated by the each magnet (164a, 164b) from being leaked to the outside. The coil (140) is inserted by a core (143), and the detachment prevention plate (130) and the support bracket (150) are made of silicon steel which is a magnetic plate. The detachment prevention plate (130), the support bracket (150) and the core (143) serve to prevent the flux generated by the each magnet (164a, 164b) from being leaked to the outside and function as flux paths as well.

The elastic member (170) elastically supports the vibrating unit (160) inside the housing. That is, the elastic member (160) is shaped of a "U" letter, and both distal ends of the elastic member (160) are coupled to the vibrating unit (160). The elastic member (160) is centrally coupled to the housing (110) to transfer the vibration generated by the vibrating unit (160) to the housing (110). The center and the both distal ends of the elastic member (170) may be folded or angled at 90 degrees.

To be more specific, a distal end of the elastic member (170) is coupled to a left lateral surface of the weight (161). The other distal end of the elastic member (170) facing the distal end of the elastic member (170) is coupled to the right lateral surface of the weight (161). The center of the elastic member (170) is coupled to any one of lateral plates (113c, 113d) of the housing (110) perpendicularly erected relative to the left lateral surface and right lateral surface of the weight (161).

In a case the vibration of the vibrating unit (160) is transferred to the housing (110) via the elastic member (170), the housing (110) is vibrated to generate a vibration signal, and the vibration signal is transferred to the product installed with the housing (110) in response to the vibration of the housing (110).

As shown in FIG. 4, the elastic member (170) forms an axial symmetry to a vertical bisector (L1-L1) of the coil (140) in parallel with the left lateral surface or the right lateral surface of the weight (161) facing a vibration direction of the vibrating unit (160).

Now, referring to FIG. 3, a magnetic fluid (180) may be coated on a bottom surface and an upper surface of the weight (161) respectively facing the pad (112) of the case (111) and the cover (116), The magnetic fluid (180) contacts the pad (112) of the case (111) and the cover (116) to prevent the vibrating unit (160) from being inclined relative to the pad (112) and the cover (116). Furthermore, the magnetic fluid (180) serves as a damper for rapidly stopping the vibrating unit (160) when the vibrating unit (160) is to be stopped.

The magnetic fluid (180) is securely coupled to the magnetic body. To this end, the weight (161) is coupled with a support magnet (183), a periphery of which is coated with magnetic fluid (180). In order to insure a secure coupling of the support magnet (183), an external surface of the weight (161) is formed with a coupling groove (161a) insertedly coupled to the support magnet (183).

In a case the inside of the housing (110) is hermetically sealed, the vibrating unit (160) cannot be smoothly vibrated, so that a ventilation hole (not shown) may be formed at the housing (110) to enable a communication inside and outside.

Now, referring to FIG. 4, operation of the linear operation according to the first exemplary embodiment of the present invention will be described.

In a case a current is supplied to the stator (140), the magnet (164) is vibrated by the electromagnetic force formed by the magnet (164) and the stator (140), whereby the weight (161) coupled to the magnet (164) is vibrated. At this time, in the structural view of the stator (140) and the vibrating unit (160), the vibrating unit (160) is vibrated between a left lateral plate (113a) and a right lateral plate (113b) of the case (111) which is a lateral direction of the housing (110). Therefore, the housing (110) can be further thinned.

In a case the vibrating unit (160) is vibrated, the vibration of the vibrating unit (160) is transferred to the housing (110) via the elastic member (170). However, because the housing (110) is mounted on the product, the product is inevitably generated with the vibration signal.

MODE FOR THE INVENTION

FIGS. 5 through 9 are plan views of a linear vibrator according to second through sixth exemplary embodiments of the present invention.

Second Exemplary Embodiment

Figure 5:
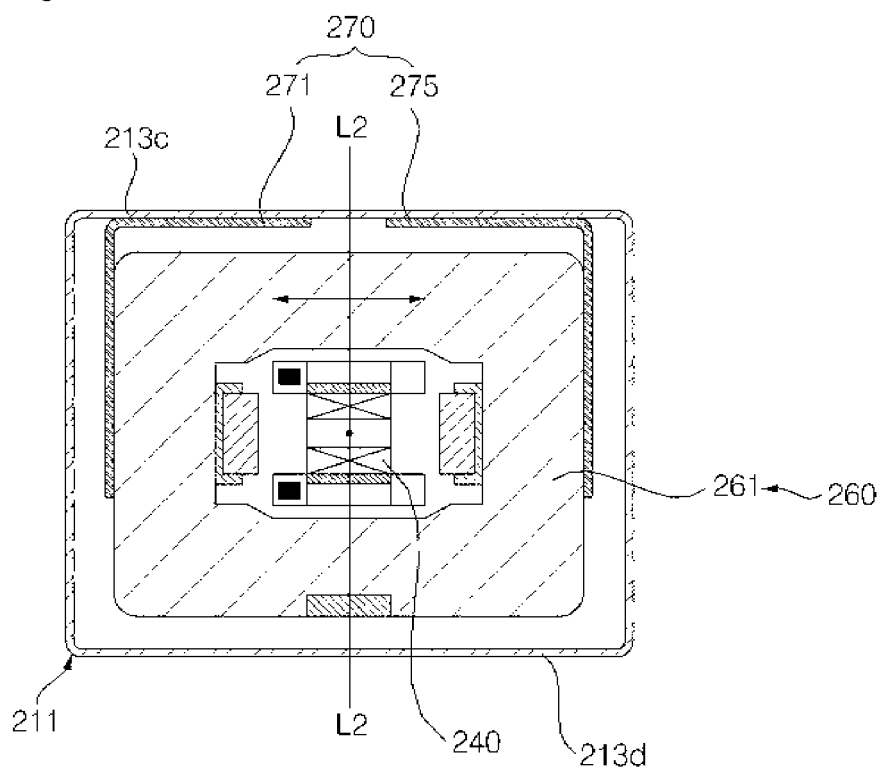
FIGS. 5 through 9 are plan views of a linear vibrator according to second through sixth exemplary embodiments of the present invention.

FIG. 5 is a plan view of a linear vibrator according to the second exemplary embodiment of the present invention.

The linear vibrator illustrated in FIG. 5 is substantially the same as the one described and explained in FIGS. 1 through 4 except for the elastic member. Therefore, no overlapped explanation to the identical portions or structures will be provided, where like reference numerals refer to like parts or portions throughout the designation of drawings.

Referring to FIG. 5, an elastic member (270) is comprised of first and second elastic members (271, 275) each having corresponding shape. Each of the first and second elastic members (271, 275) may be bent at an angle of 90 degrees in the shape of "L" letter.

One side of the first elastic member (271) is coupled to the left lateral surface of the weight (261) facing the vibrating direction of the vibrating unit (260), and the other side of the first elastic member (271) is coupled to an upper lateral plate (213c) of a case (211) perpendicularly erected to the left lateral surface of a weight (261).

One side of the second elastic member (275) is coupled to a right lateral surface facing the left lateral surface of the weight (261) facing the vibrating direction of the vibrating unit (260), and the other side of the second elastic member (275) is coupled to an upper lateral plate (213c) of a case (211) perpendicularly erected to the right lateral surface of the weight (261). Alternatively, the other side of the second elastic member (275) may be coupled to a bottom lateral plate (213d) opposite to the upper lateral plate (213c) of the case (211).

In a case the other side of the elastic member (275) is coupled to the upper lateral plate (213c) of the case (211), the first and second elastic members (271, 275) form an axial symmetry relative to a vertical bisector (L1-L2) of a coil (240) in parallel with the left lateral surface and the right lateral surface of the weight (261) facing a vibration direction of the vibrating unit (160).

In a case the other side of the second elastic member (275) is coupled to a bottom lateral plate (213d) of the case (211), the first and second elastic members (271, 275) form a point symmetry about the coil (240). The other distal end of the first elastic member (271) coupled to the case (211) and the other distal end of the second elastic member (275) may be integrally formed, whereby the elastic member according to the second exemplary embodiment structurally comes to be the same as the elastic member (170) according to the first exemplary embodiment.

Third Exemplary Embodiment

Figure 6:
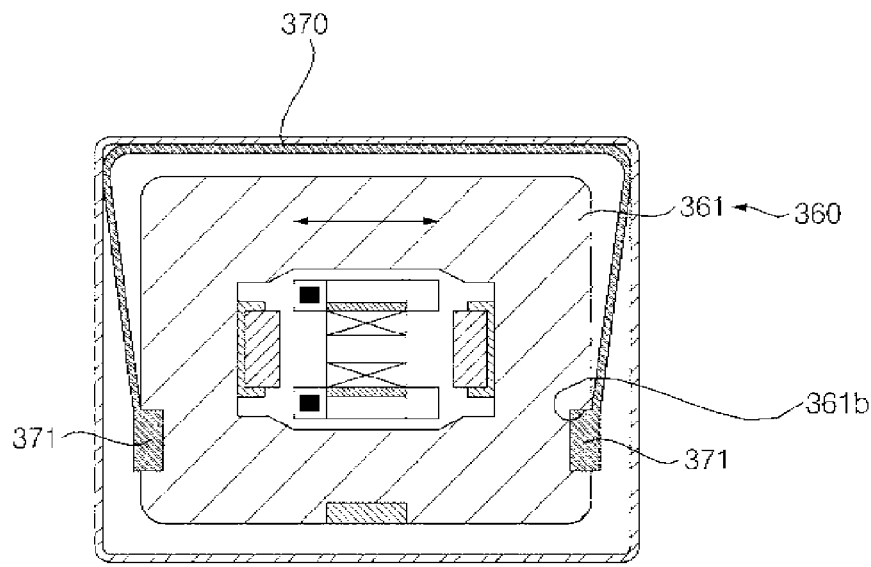

FIG. 6 is a plan view of a linear vibrator according to the third exemplary embodiment of the present invention.

The linear vibrator illustrated in FIG. 6 is substantially the same as the one described and explained in FIGS. 1 through 4 except for the elastic member. Therefore, no overlapped explanation to the identical portions or structures will be provided, where like reference numerals refer to like parts or portions throughout the designation of drawings.

Referring to FIG. 6, an elastic member (370), an elastic member (370) is twice-folded clockwise, whereby the elastic member (370) comes to have two distal end portions, each end portion facing the other and a central portion, where each of the two distal end portions and the central portion are formed at an acute angle.

Each of the two distal end portions of the elastic member (370) is formed with a coupling piece (371), and a weight (361) of a vibrating unit (360) is formed with a coupling groove (361b) to be coupled with each coupling piece (371), where a coupling power between the elastic member (370) and the weight (361) is reinforced by the coupling piece (371) and the coupling groove (361b).

Fourth Exemplary Embodiment

Figure 7:
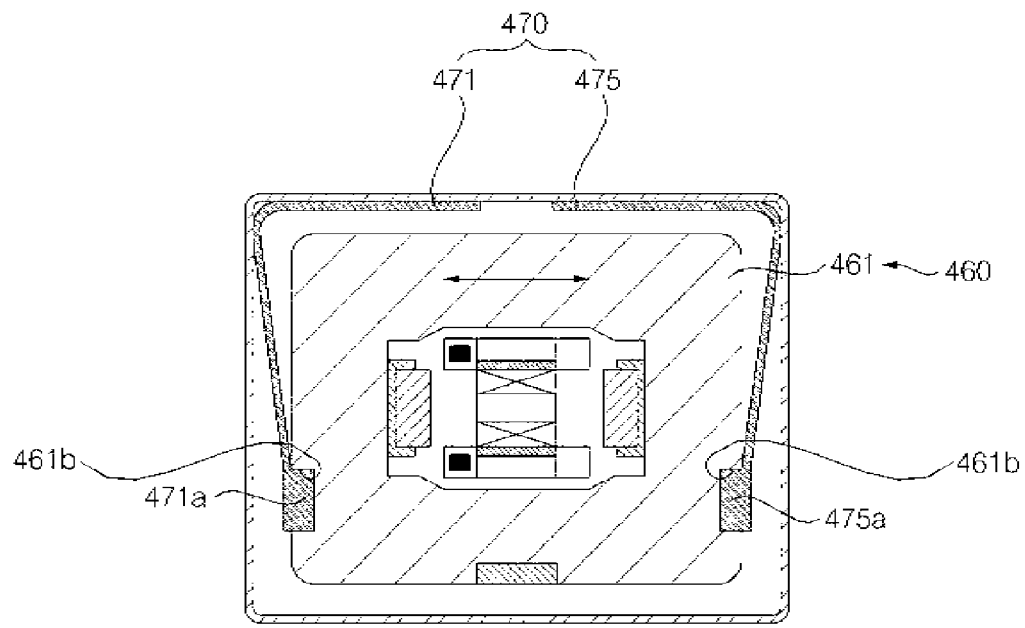

FIG. 7 is a plan view of a linear vibrator according to the fourth exemplary embodiment of the present invention.

The linear vibrator illustrated in FIG. 7 is substantially the same as the one described and explained in FIGS. 1 through 4 except for the elastic member. Therefore, no overlapped explanation to the identical portions or structures will be provided, where like reference numerals refer to like parts or portions throughout the designation of drawings.

Referring to FIG. 7, an elastic member (470) is formed with first and second elastic members (471, 475), each facing the other, and the first and second elastic members (471, 475) are folded at an acute angle.

Each distal end of the first and second elastic members (471, 475) is formed with coupling pieces (471a, 475a) and a weight (461) of a vibrating unit (460) is formed with a coupling groove (461b) to be coupled with each coupling piece (471a, 475a), where a coupling power between the elastic member (470) and the weight (461) is reinforced by the coupling pieces (471a, 475a) and the coupling groove (461b). The other end of the first elastic member (471) and the other end of the second elastic member (475) may be integrally formed, whereby the elastic member according to the fourth exemplary embodiment comes to have the same structure as that (370) of the third exemplary embodiment.

Fifth Exemplary Embodiment

Figure 8:
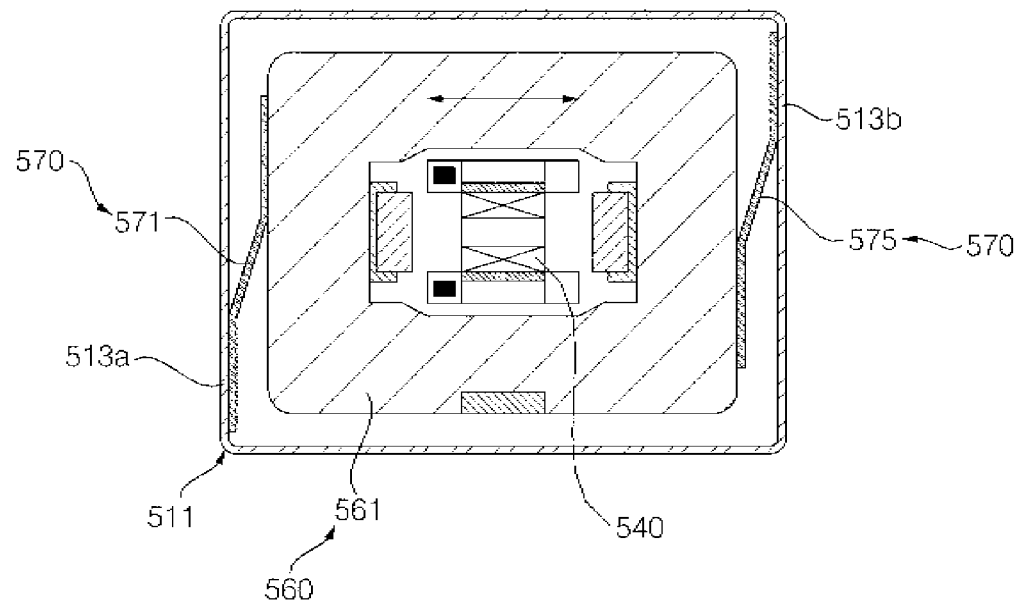

FIG. 8 is a plan view of a linear vibrator according to the fifth exemplary embodiment of the present invention.

The linear vibrator illustrated in FIG. 8 is substantially the same as the one described and explained in FIGS. 1 through 4 except for the elastic member. Therefore, no overlapped explanation to the identical portions or structures will be provided, where like reference numerals refer to like parts or portions throughout the designation of drawings.

Referring to FIG. 8, an elastic member (570) is formed with first and second elastic members (571, 575), each facing the other, and an upper side and a bottom side of the first elastic member (571) are formed in parallel, while a central side is bent at an acute angle relative to the upper side and the bottom side. The second elastic member (575) is configured in the same way as that of the first elastic member (571).

The upper side of the first elastic member (571) is coupled to a left hand side surface of a weight (561) facing the vibrating direction of a vibrating unit (560), while the bottom side of the first elastic member (571) is coupled to a left hand side plate (513a) of a case (511) facing the left hand side of the weight 561). The bottom side of the second elastic member (575) is coupled to a right hand side surface of the weight (561) facing the vibrating direction of a vibrating unit (560), while the upper side of the second elastic member (575) is coupled to a right hand side plate (513b) of the case (511) facing the right hand side of surface of the weight (561).

Sixth Exemplary Embodiment

Figure 9:
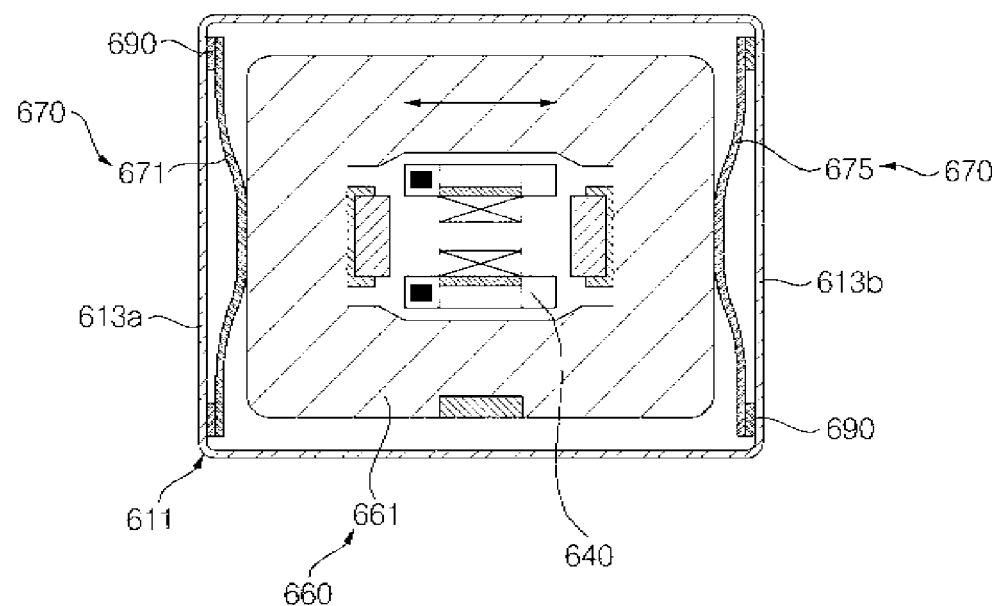

FIG. 9 is a plan view of a linear vibrator according to the sixth exemplary embodiment of the present invention.

The linear vibrator illustrated in FIG. 9 is substantially the same as the one described and explained in FIGS. 1 through 4 except for the elastic member. Therefore, no overlapped explanation to the identical portions or structures will be provided, where like reference numerals refer to like parts or portions throughout the designation of drawings.

Referring to FIG. 9, an elastic member (670) is formed with first and second elastic members (671, 675), each facing the other. Each of the central portion of the first and second elastic members (671, 675) is protruded upwards when seen from a plan view.

The central portion of the first elastic member (671) is coupled to a left hand side surface of a weight (661) facing the vibrating direction of a vibrating unit (660), while an upper side and the bottom side are respectively coupled to an upper side and a bottom side of the a left side plate (613a) of a case (611) facing the left side surface of the weight (661). Furthermore, a central portion of the second elastic member (675) is coupled to a right hand side surface of a weight (661) facing the vibrating direction of a vibrating unit (660), while an upper side and the bottom side are respectively coupled to an upper side and a bottom side of the a right side plate (613b) of a case (611) facing the right side surface of the weight (661).

At this time, a support plate (690) is interposed between both distal end portions of the first elastic member (671) and the left side plate (613a) of the case (611), and between both distal end portions of the second elastic member (675) and the right side plate (613b) of the case (611). The support plate (690) broadens a coupling area between the first elastic member (671) and the case (611), and between the second elastic member (675) and the case (611) to thereby reinforce the coupling strength.

Seventh Exemplary Embodiment

Figure 10:
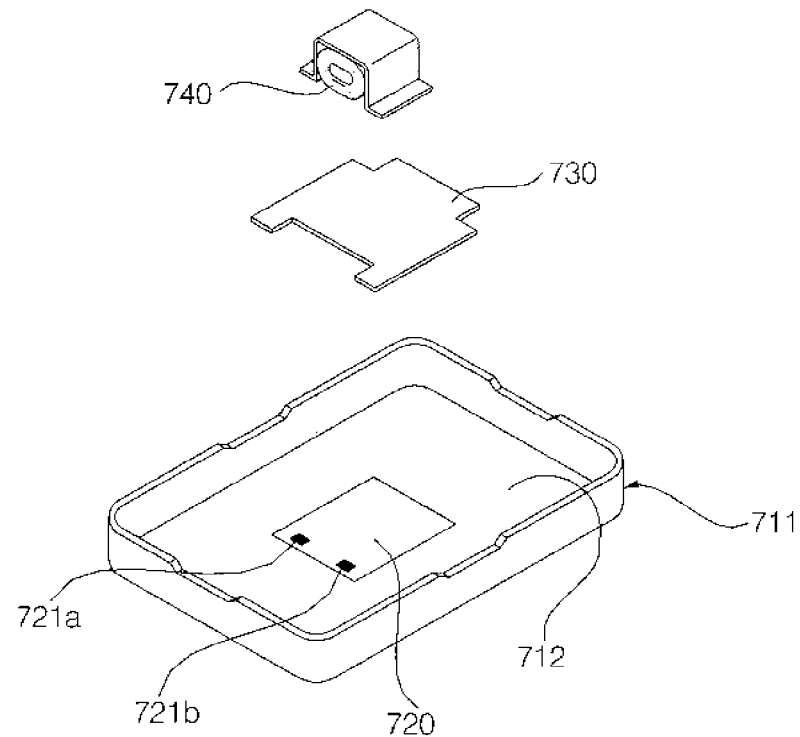
FIGS. 10 and 11 are exploded perspective view of essential parts and bottom surface perspective view of a linear vibrator according to seventh exemplary embodiment of the present invention.
Figure 11:
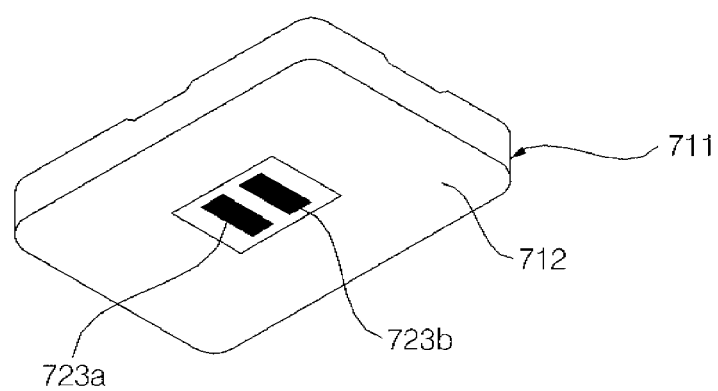

FIGS. 10 and 11 are exploded perspective view of essential parts and bottom surface perspective view of a linear vibrator according to seventh exemplary embodiment of the present invention.

The linear vibrator illustrated in FIGS. 10 and 11 are is substantially the same as the one described and explained in FIGS. 1 through 4 except for the PCB and detachment prevention plate. Therefore, no overlapped explanation to the identical portions or structures will be provided, where like reference numerals refer to like parts or portions throughout the designation of drawings.

Referring to FIGS. 10 and 11, a PCB (720) is provided in one plate. The PCB (720) is formed thereon with connection terminals (721a, 721b) each being connected to (+) and (−) lead lines of a coil (740), and formed thereunder with connection terminals (723a, 723b) each being connected to (+) and (−) power terminals of the product. Therefore, a detachment prevention plate (730) is centrally coupled to the PCB (720) and is coupled to a pad (712) of a case (712) at both distal ends.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

INDUSTRIAL APPLICABILITY

The linear vibrator according to the present invention has an industrial applicability in that a vibrating unit is vibrated in the width direction to enable a reduced thickness of the housing.

The invention claimed is:

1. A linear vibrator comprising:
a housing;
a pair of coupling holes formed on the housing;
a Printed Circuit Board (PCB) having a connection terminal electrically connected to a stator arranged in each coupling hole;
the stator fixed inside the housing and configured to received a current from the PCB;
a vibrating unit with an opening surrounding the stator, wherein the vibrating unit is configured to vibrate inside the housing by interacting with the stator;
an elastic member configured to elastically support the vibrator inside the housing and transfer the vibration of the vibrating unit to the housing; and
a detachment prevention plate arranged on the pair of coupling holes, wherein the stator is arranged on the detachment prevention plate.

2. The linear vibrator of claim 1, wherein the opening is centrally arranged at the vibrating unit.

3. The linear vibrator of claim 1, wherein the detachment prevention plate is made of silicon steel which is a magnetic plate.

4. The linear vibrator of claim 1, wherein the stator includes a core and a coil surrounding the core.

5. The linear vibrator of claim 4, wherein the coil is fixed inside a support bracket which includes a magnetic body, and the support bracket is fixed on the detachment prevention plate.

6. The linear vibrator of claim 5, wherein the support bracket includes a silicon steel.

7. The linear vibrator of claim 1, wherein the vibrating unit comprises:
a weight surrounding the stator, and
a pair of magnets coupled to an inner circumferential surface of the weight, each facing the other, and interacting with the stator to vibrate the weight.

8. The linear vibrator of claim 7, wherein the vibrating unit further comprises a yoke coupled between each magnet and the weight.

9. The linear vibrator of claim 1, wherein the elastic member comprises:
two distal portions coupled to both surfaces of the vibrating unit, and
a central portion coupled to a lateral surface of the housing, each of the two distal portions and the central portion connected at either an acute angle or a right angle.

10. The linear vibrator of claim 9, wherein the elastic member further comprises a coupling piece at each end of the two distal portions and the vibrating unit has a coupling groove coupled to the coupling pieces.

11. The linear vibrator of claim 1, wherein the elastic member comprises:
a first elastic member in which a first portion is coupled to a lateral surface of the vibrating unit, and a second portion connected to the first portion is coupled to a lateral surface of the housing, and
a second elastic member in which a third portion is coupled to the other surface facing the lateral surface of the vibrating unit, and a fourth portion connected to the third portion is coupled to either the lateral surface of the housing or the other surface facing the lateral surface of the housing.

12. The linear vibrator of claim 11, wherein the first and the second portions are connected at either an acute angle or a right angle, and the third and the fourth portions are connected at either an acute angle or a right angle.

13. The linear vibrator of claim 11, wherein the elastic member further comprises a coupling piece at each end of the first and third portions and the vibrating unit has a coupling groove coupled to each coupling piece.

14. The linear vibrator of claim 1, wherein the elastic member comprises:

a first elastic member coupled to a lateral surface of the vibrating unit and the housing facing the lateral surface of the vibrating unit, and a second elastic member coupled to the other surface facing the lateral surface of the vibrating unit and the housing facing the other surface of the vibrating unit.

15. The linear vibrator of claim 1, wherein the elastic member comprises:

a first elastic member interposed between a first lateral surface of the vibrating unit and the housing facing the first lateral surface of the vibrating unit, both distal ends of the first elastic member being fixed at the housing and a central portion of the first elastic member being contacted with the first lateral surface of the vibrating unit, and a second elastic member interposed between a second lateral surface of the vibrating unit and the housing facing the second lateral surface of the vibrating unit, both distal ends of the second elastic member being fixed at the housing, and a central portion second elastic member being contacted with the second lateral surface of the vibrating unit.

16. The linear vibrator of claim 1, wherein the housing comprises:

a pad, a case having a lateral plate bent from an edge of the pad, and a cover coupled to the lateral plate.

17. The linear vibrator of claim 16, wherein an insertion groove is formed at the lateral late of the case and a coupling protrusion is formed at the cover to be insertedly coupled to the insertion groove.

* * * * *